May 19, 1953    P. TALMEY ET AL    2,638,838
APPARATUS FOR TREATING GRANULAR MATERIAL
IN A CONTINUOUS PROCESS
Filed May 16, 1947    4 Sheets-Sheet 1

INVENTORS.
Paul Talmey,
BY Otto R. Kuster.
George T. Haight
atty.

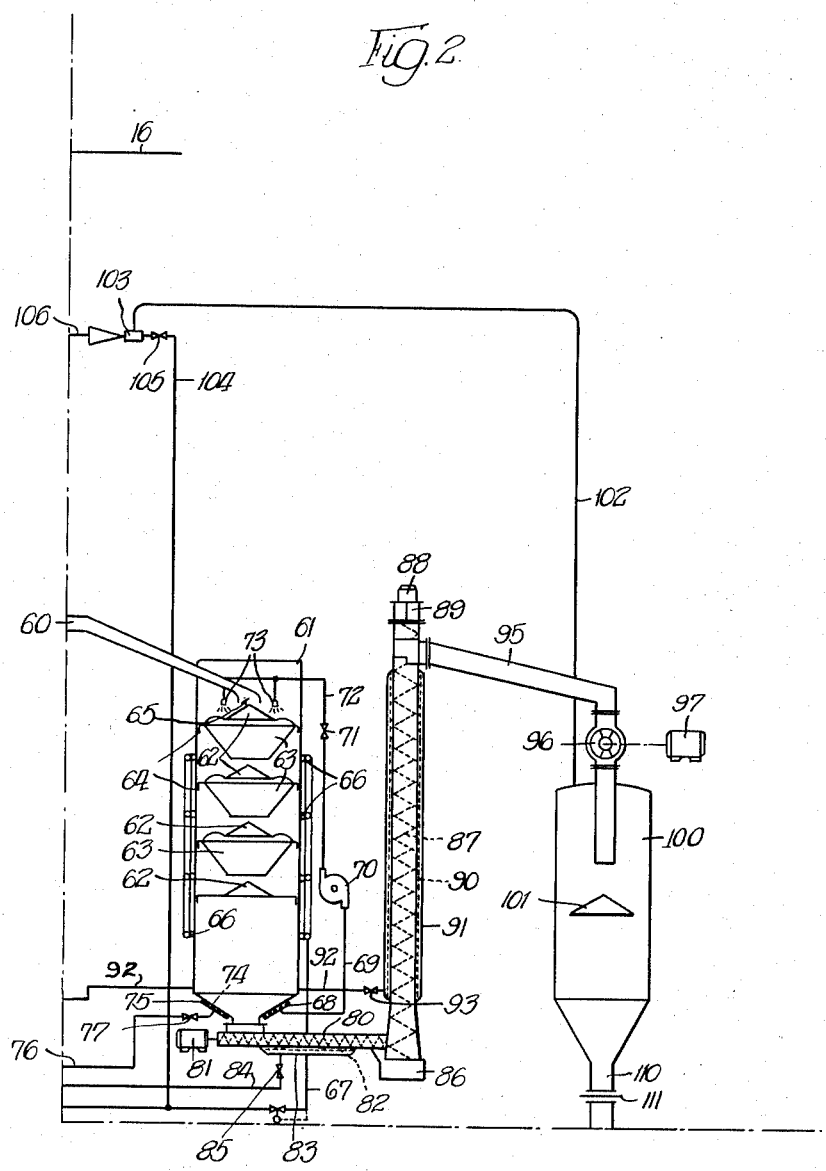

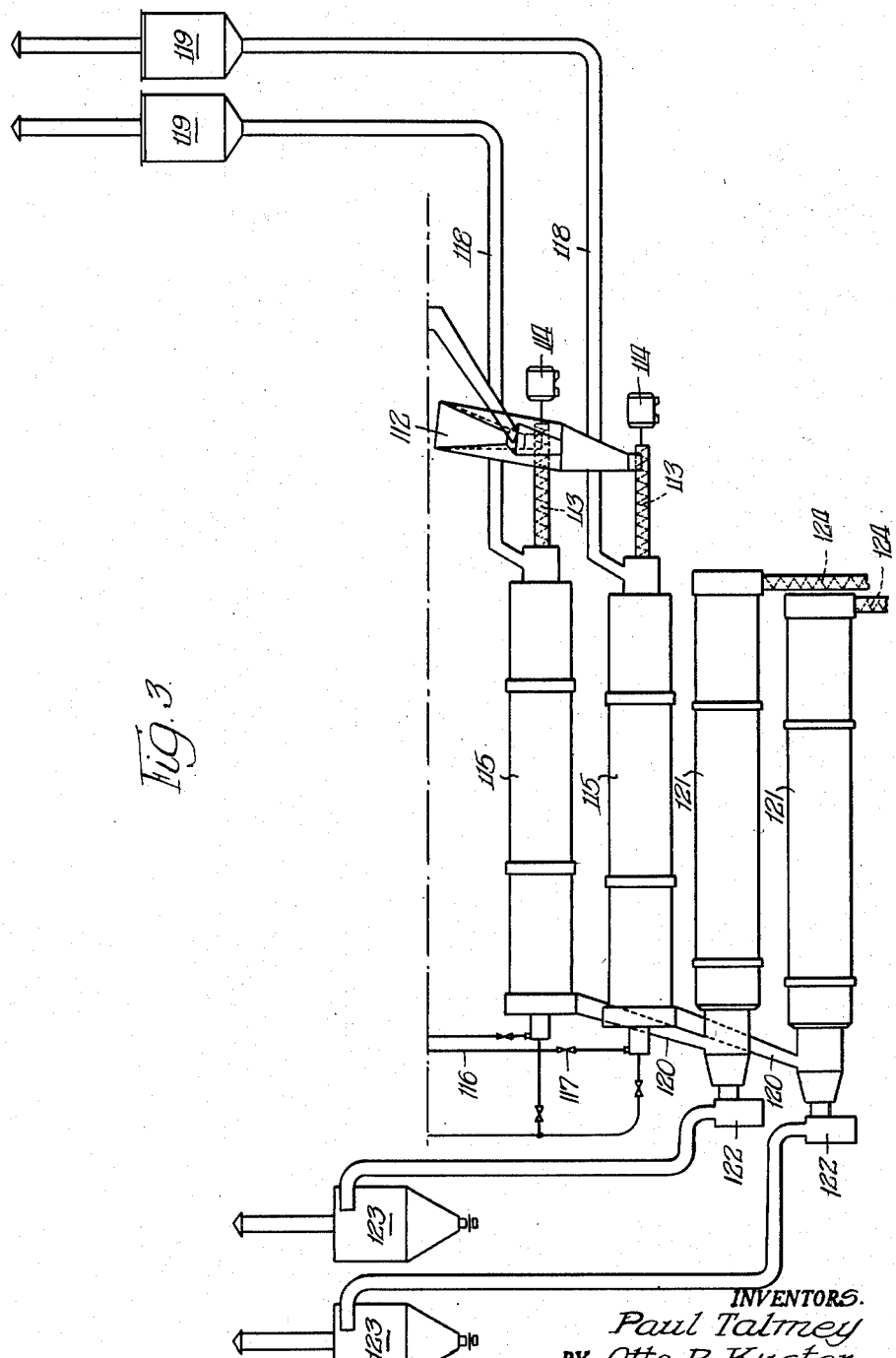

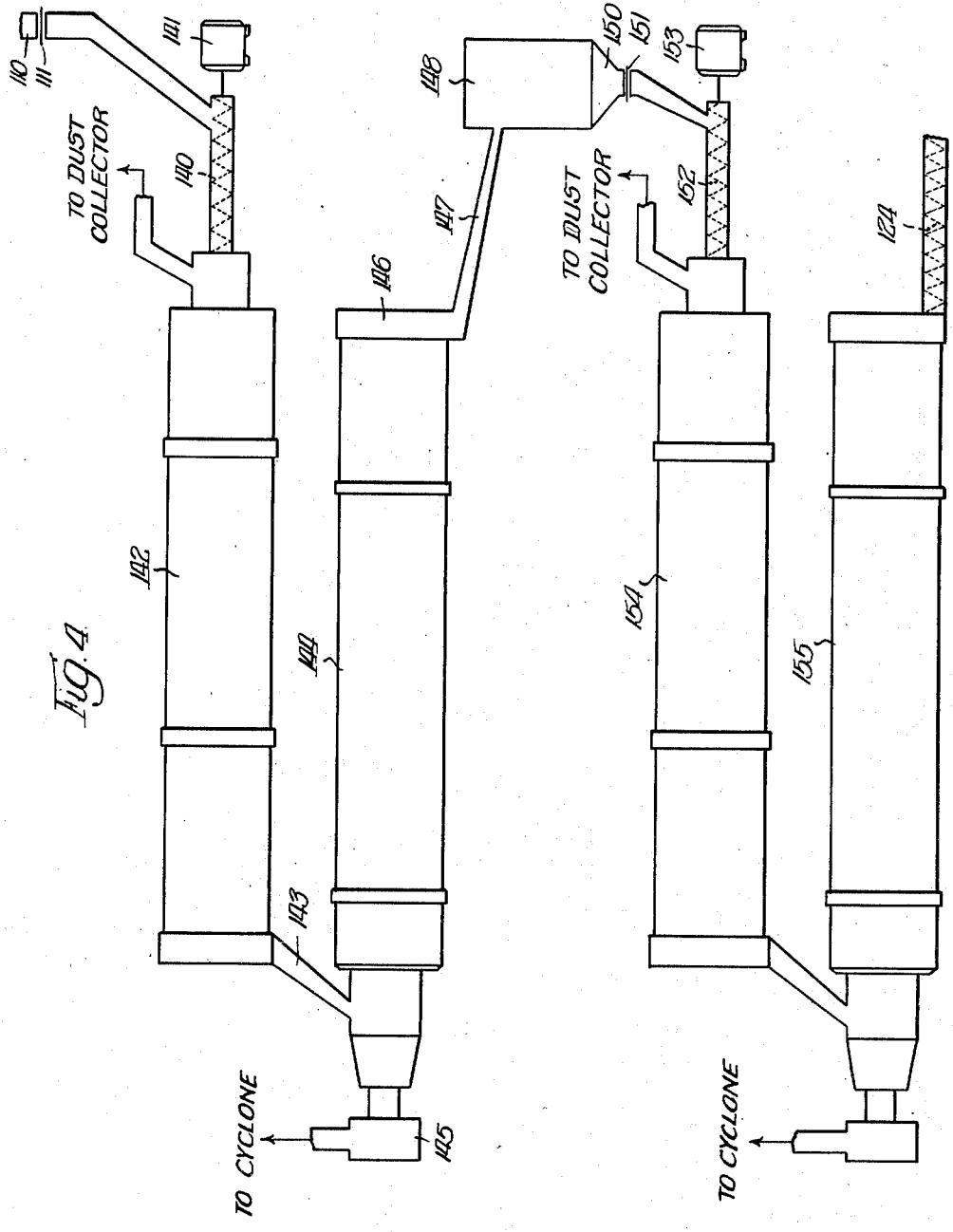

Patented May 19, 1953

2,638,838

UNITED STATES PATENT OFFICE 2,638,838

APPARATUS FOR TREATING GRANULAR MATERIAL IN A CONTINUOUS PROCESS

Paul Talmey and Otto R. Kuster, Chicago, Ill., assignors to General American Transportation Corporation, Chicago, Ill., a corporation of New York Application May 16, 1947, Serial No. 748,598

5 Claims. (Cl. 99—237)

This invention relates to a method of and apparatus for treating granular materials in a continuous process and has for its principal object the provision of a new and improved method and apparatus of this kind.

It is a main object of the invention to provide a method of treating granular material in a continuous process through the steps of soaking, dewatering, cooking, dewatering, dehydrating and cooling, wherein the conditions to which the material is subjected at each stage of the process can be accurately controlled.

Another main object of the invention is to provide apparatus for carrying out such a continuous process in the controlled steps named.

Another object of the invention is to provide apparatus for carrying out such a process which is capable of accurate adjustment and control at each stage of the process.

Another object of the invention is to provide an improved pressure cooker for use in such a continuous process system.

Another object of the invention is to provide a process wherein treating materials discarded in one stage of the process are utilized in another stage to effect economies of operation of the process.

Another object of the invention is to provide apparatus for a continuous process plant that can be built and maintained at low cost and operated economically.

Further objects of the invention not specifically mentioned here will be apparent from the description and claims which follow, reference being had to the accompanying drawings wherein a preferred embodiment of the invention is shown by way of example and in which:

Fig. 2 is a diagrammatic view illustrating the pressure and flashing apparatus;

Fig. 3 is a diagrammatic view illustrating the drying and cooling apparatus; and Fig. 4 is a diagrammatic view illustrating a modified form of drying and cooling apparatus.

Figure 1:
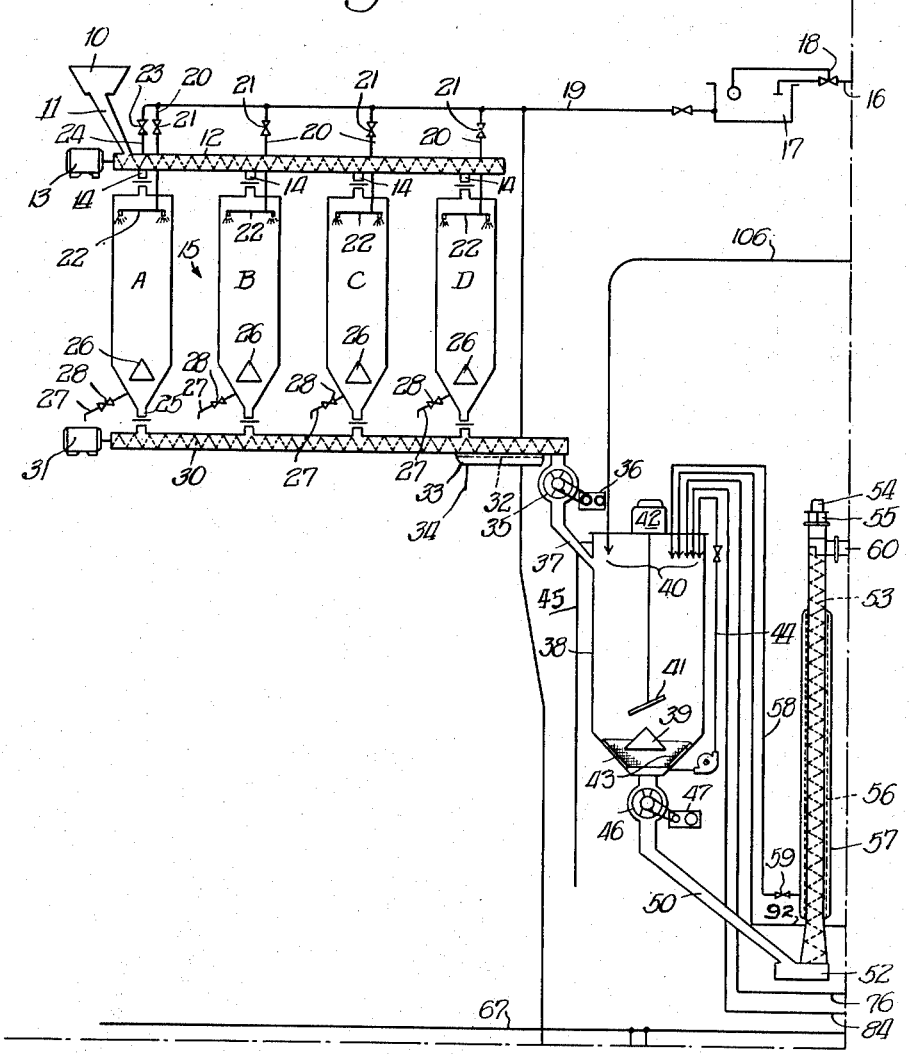
Fig. 1 is a diagrammatic view of the pre-soaking and soaking apparatus.

In the treatment of many hydroscopic granular materials such as rice and other grains, shredded pulp materials, etc., the material is subjected first to a soaking in cold water usually for a considerable period of time to permit the material to absorb a quantity of water and thereby effect the dissolution of certain parts of the material. This pre-soaked material may be then mixed with a quantity of water to form an admixture of granular material and water containing enough water to make it flow readily so that it may be introduced into a pressure system by suitable proportioning means such as a star valve or a pump.

Within the pressure system the material is drained of its excess mechanically entrained water and then introduced to a cooking stage, usually a steam cooker, wherein the material is cooked to a desired degree to produce the required results.

Material from the cooker contains a certain amount of entrained and absorbed water or condensate from the steam, which must be removed and the material dried and cooled preparatory to further steps, such as milling, canning, etc.

In Patents Nos. 2,334,665 and 2,334,666, issued to Yonan-Malek November 16, 1943, there is disclosed processes for treating paddy rice to dissolve out of the hull and bran of the rice certain valuable ingredients which are incorporated in the rice kernel to improve its characteristics as set forth in these patents. Processes of this kind have heretofore usually been carried out in batches, that is to say, a certain quantity of rice is soaked, then moved into cooking apparatus where it is cooked, and then moved from that apparatus into dehydrating and cooling apparatus to complete the process.

The present invention provides a method and apparatus for carrying out, in a continuous operation, a process such as in the above Malek patents, wherein the material, rice for example, is moved through the various steps and stages of the process in a continuous stream, as contrasted with the batches of the prior art. While the method and apparatus of the present invention is capable of carrying out the specific processes disclosed by Malek, it is not limited to such processes but may be employed for other uses to which it is equally well adapted.

Preferably in the adaptation of a process such as in the Malek patents to continuous process operation, the method employs the steps of moving the untreated material at a uniform rate of speed into the first or soaking stage. Spray soaking is employed to insure uniform wetting of the material with a minimum of water, the speed of travel of the material being maintained so that the material is soaked for the required time.

The material moves out of the spray soaking at a uniform rate and unabsorbed water carried by it is drained off, taking with it any dirt or extraneous matter that may have adhered to the raw material. The spray soaked material is then mixed with water, usually warmer water that was used in the spray soaking, sufficient in quantity to form an admixture that is highly fluid and in which the granular material is free from lumps or stuck-together granules. This admixture is then forced into the pressure system.

Within the pressure system, excess water employed to make the admixture fluid is drained off and returned to be mixed again with the material following in the process. This dewatering within the pressure system economizes on the steam requirements of the system.

Dewatered material in the pressure system is next moved into an autoclave where the stream of material is again thoroughly broken up and free from lumps of stuck-together granules. Live steam is played upon the material to parboil it to a required degree, the material and condensate falling to the bottom of the autoclave and then moving out of the autoclave at a uniform rate. Excess condensate is removed from the material and a part of such condensate sprayed back into the top of the autoclave to aid in breaking up the stream of material entering it. The remainder of the condensate so unmoved is returned to an earlier stage of the process for further use.

The dewatered material is then discharged from the pressure system, the sudden reduction in pressure causing flash steaming which removes some of the water within the material. The material is then dehydrated and cooled down to a normal temperature in readiness for such further processing as may be required.

In its preferred form, the apparatus of the present invention consists of a variable speed conveyor adapted to convey the untreated raw material from a suitable storage bin into one of a plurality of pre-soaking tanks wherein the material is sprayed with a liquid, such as water, the material remaining in the tank for a sufficient period of time to permit it to soak up a predetermined amount of the liquid. The pre-soaking tanks are arranged to deliver the material, less any excess entrained moisture, into a second variable speed conveyor which discharges the material through a proportioning device into a mixer wherein sufficient water is added to form an admixture which flows readily.

The admixture is removed from the mixer at a controlled rate by suitable means, such as a star valve or a pump, and forced into the pressure system.

The material from the proportioning device is delivered to an elevator which carries it above the level of the water therein, this conveyor containing separating apparatus for removing excess water from the material after and as that material is elevated above the water level in the system. The material so deprived of its excess water is discharged through a suitable duct, also within the pressure system, into an autoclave or pressure cooker wherein the material enters in a stream that is broken up so that the material falls through the autoclave as individual granules or particles rather than as lumps of matted-together material. Cooking steam under suitable pressure is played upon the material while it is so falling, and condenses to fall with the material to the bottom of the autoclave to aid in cooking the material to a desired degree. The level of condensate in the bottom of the autoclave is controlled by draining off excess condensate, part of which is run through a suitable pump and carried to spray heads located in the top of the autoclave where it is sprayed upon the stream of material to aid in breaking up that stream into substantially individual granules.

A second proportioning means, such as a variable speed conveyor or a star valve, also in the pressure system, removes the thus parboiled material from the bottom of the autoclave and delivers it to a conveyor which elevates it above the condensate level therein, that portion of the container above this level containing apparatus for removing the excess condensate from the material, which condensate is drained off and preferably conducted back into the mixer so that the heat contained in it is not lost.

The material thus made substantially water-free is carried from the conveyor through a suitable duct, also in the pressure system, to an outlet means such as a star valve that is operated to release the material from the pressure system at a predetermined rate and to discharge that material into a flash tank which is maintained at a pressure lower than the pressure system so that a part of the moisture in the material will be liberated by flash steaming brought on by the sudden change in pressure to which the material is subjected. The material is conducted out of the bottom of this flash tank into driers which dehydrate it down to a specified low water content and deliver it to coolers in which the temperature of the material is reduced down to room temperature or below, preparatory to the next step which, in the case of rice, would be a milling step to remove the hull from the kernel.

Referring now to the drawings in more detail. In the preferred embodiment shown by way of example, the material to be treated is led out of a storage bin 10 through a duct 11 into a conveyor 12 that is driven by a suitable variable speed drive 13 so that the conveyor may be adjusted to move a predetermined quantity of rice in a predetermined time. For convenience herein, this quantity of rice will be referred to as 100 pounds per minute, it being understood that this figure is given by way of example only.

Located beneath the conveyor 12 and connected thereto by suitable gated ducts 14 are a plurality of pre-soaking tanks 15, designated as tanks A, B, C, and D. Each of these tanks 15 are large and capable of holding a substantial quantity of material, the volume of the tanks depending upon the length of time that the material is to be pre-soaked, the combined volume of the tanks being such that with the conveyor running continuously the material can remain in one of the tanks for the required time, say, for example, six hours. Four tanks 15 are shown in the drawings, but this number may be increased or decreased as desired, within the teaching of the invention.

In order to spray the material in tanks 15 at a given rate, a constant pressure source of water is required. To this end, a suitable main 16 from the source, not shown, may feed into an elevated tank 17 through a float controlled valve 18 by which the head of water is maintained constant. Leading out of tank 17 is a header 19 which has a branch 20 leading into each of the soaking bins A to D, inclusive. Each branch 20 is equipped with a valve 21 by which the flow through that branch can be regulated. If the source to which main 16 is connected is a constant pressure source, such as a standpipe, tank 17 and valve 18 may be omitted and the main 16 connected directly to header 19.

Within each tank 15 are spray heads 22 through which the water is sprayed upon the material as it falls into the tank, this arrangement uniformly wetting the individual grains or particles of the material with a minimum of water. Spray heads 22 also are arranged so that the water continuously plays upon the walls of the tank as well as upon the material, thus preventing the material from sticking to the walls.

While the conveyor 12 is shown as a screw conveyor, it will be understood that other suitable types of conveyor may be substituted within the teachings of the invention. A screw conveyor is advantageous in that, if desired, water from the header 19 may be conducted through a valve 23 and through pipe 24 into a conveyor jacket at a predetermined rate and there mixed with the material in the conveyor.

The bottoms of the tanks 15 are of conical shape terminating in gated ducts 25 that discharge into a conveyor 30, likewise shown as a screw conveyor driven by a suitable variable speed drive 31. Located within each tank and just above the conical part thereof is a baffle 26 which prevents material in the centers of the tanks from funneling out through the ducts 25. As shown, baffles 26 are conical, but other shapes may be used. The water sprayed on the side walls of the tanks aids baffles 26 in breaking up bridging and coring of the material.

To control the level of water in the tanks, each may be provided with a drain pipe 27 and a valve 28 which is adjustable to permit draining off enough water to maintain a desired level in the tanks. Pipes 27 lead to a sump, not shown, and, if desired, the water collected in the sump may be returned to the tank for further use. In cases where the material being processed is dirty, filtering of this water may be advisable, and in certain instances the water may be discarded.

Tanks 15 may be used in a number of ways within the teachings of the invention. If desired, inlet gates 14 may be adjusted so that the conveyor 12 delivers material equally to all tanks simultaneously, and valves 25 may be adjusted so that material will flow out of the tanks equally and at a rate slow enough to cause the material to remain in the tanks for the time required for the degree of pre-soaking wanted. In other instances, the gates 14 can be opened one at a time and thus all the material delivered to one tank. Gates 25 may be similarly set to discharge the tanks one at a time, with the discharge coming from a tank different from the one then being filled. The mode of operation will depend upon the process to be carried out with the apparatus, the speed of delivery, length of soaking time, and other factors not of the essence of the present invention.

The soaking of the material, as explained in the above Malek patent, diffuses certain ingredients in the material by absorbing water. There may be an excess amount of unabsorbed water with the material, and in order to remove this excess water, conveyor 30 is provided with a section of casing 32 containing a plurality of perforations and with an auxiliary casing 33 out of which a discharge pipe or duct 34 is led to carry off the excess water that drains out of the material. This excess water is returned to a suitable sump, not shown, so that it may be re-used in the process if desired.

Conveyor 30 discharges into a suitable proportioning device, such as a star valve 35, that is driven at a constant rate by a suitable source of power 36 to deliver material through duct 37 into a mixer 38 preferably consisting of a cylindrical shell disposed with its axis vertical and having a conical bottom with a baffle 39 located near the bottom coaxially of the cylindrical shell. Water is added with the material in the mixer through suitable nozzles 40 in quantity sufficient to form an admixture that is highly fluid.

Preferably the admixture of water and material is maintained in a state of turbulence sufficient to insure that the material will be broken up into individual particles and distributed fairly evenly throughout the water. This turbulence ordinarily can be obtained by the water playing into the mixture through the nozzles 40. However, in certain instances where additional turbulence is desirable, an agitator 41, driven by a suitable source of power 42, may be employed.

In the normal operation of the apparatus, the material will remain in the mixer but a short period of time, say about three minutes, and the water in the mixer will be somewhat warmer than that used in the pre-soaking tanks 15. In certain instances, water of a temperature as high as 200° F. may be used. Circulation of the water in the mixer 38 may be increased by suitable screening means 43 from which a pipe is led to a pump that discharges back into the mixer through a nozzle 40 and pipe 44 under the control of a valve in that pipe. The level of water in the mixer is regulated through an overflow pipe 45 that leads to a sump, not shown, from which water is drawn for re-use if desired.

Leading out of the conical bottom of the mixer is a proportioning device, such as a star valve 46, that is driven at a constant speed by a suitable source of power 47 to discharge the admixture from the mixer into a chute 50 that is disposed in the pressure system. While a star valve 46 is shown for the purpose of forcing the material into the pressure system, other suitable means, such as a pump, may be employed if desired.

Chute 50 discharges the material into a receiving box or chamber 52 from which the material is picked up by a vertically disposed screw conveyor 53 which is driven by a source of power 54 through a gear box 55 to elevate the material above the level of the water in the mixer 38. The casing of conveyor 53 contains a perforated section 56 that is surrounded by an auxiliary jacket 57 so that as the material passes upwardly in the conveyor excess water in it is thrown through the perforations by centrifugal force. A pipe 58 leads out of this jacket into one of the nozzles of the mixer and is equipped with a valve 59 by which the rate of flow of water can be controlled. Through the joint action of valves 47 and 59, the level of water in the receiving chamber 40 is accurately maintained at a desired height. In the preferred embodiment of the invention, conveyor 53 is run at a speed of 300 or more revolutions per minute and sufficient centrifugal force is generated to separate from the material a substantial quantity of the mechanically entrained water so that the material on passing out of the conveyor is relatively free of excess water.

Conveyor 53 discharges through a suitable sealed duct 60 into an autoclave or pressure cooker 61, preferably a cylindrical shell disposed with its axis vertical and containing a series of baffles 62 disposed within the interior of the autoclave. The baffles are maintained in the shell by suitable brackets 64, as shown. The number and specific arrangement of baffles may be varied to meet specific requirements within the teachings of the invention.

The duct 60 terminates in a discharge port 65 that is located coaxially of the autoclave so that the material which moves in a solid stream through the duct falls upon the baffles and is thereby broken up so that the individual grains or particles thereof are substantially free of each other.

Located around the shell 61 of the tank of the autoclave are a plurality of jets 66 through which steam from a suitable source 67 is played upon the material as it gravitates downwardly in the autoclave. The steam condenses and collects in the bottom of the autoclave which is equipped with perforated openings 67 that are jacketed by a suitable jacket 68 out of which a pipe 69 is led to a pump 70, and through that pump and a valve 71 to a pipe 72 leading to the top of the autoclave and terminating in spray nozzles 73. By this arrangement a portion of the condensate is withdrawn from the bottom of the autoclave and forced back into the stream of material to aid in breaking that stream into individual granules and to wash down the baffles so as to prevent any material from sticking thereto. A portion of the returned condensate may be directed against the interior walls of the autoclave to wash down any material adhering thereto, thereby preventing bridging or coring of the material. The bottom of the autoclave also contains a perforated section 74 jacketed by a suitable jacket 75 out of which a pipe 76 leads through a valve 77 to one of the nozzles 40 in the mixer. By regulation of the valves 71 and 77, the height of the condensate in the autoclave can be maintained at a desired level.

The pressure of steam to be admitted to and maintained in the autoclave will depend upon the particular requirements of the process being practiced in the apparatus. In one instance, a pressure of 15 pounds per square inch will be required. The length of time that the material will remain in the autoclave will depend also on the process. Ordinarily the period will be relatively short, in one instance about fifteen minutes. Other combinations of time and pressure can be used, depending upon the process.

Leading out of the bottom of the autoclave 61 is a proportioning device shown as a screw conveyor 80, driven by a suitable variable speed drive 81 and jacketed to maintain it within the pressure system. If desired, any other suitable proportioning means, such as a star valve and chute, may be employed. The conveyor jacket contains a perforated section 82 that is overlaid with a jacket 83 out of which a pipe 84 is led through a valve 85, the pipe extending to another of the nozzles 40 in the mixer, so that by regulation of the valve 85 a predetermined amount of condensate can be drained off of the material in the conveyor.

Conveyor 80 discharges into a suitable transfer box 86 where the material is picked up by a vertically disposed screw conveyor 87 which is driven by a source of power 88 through a speed reducing drive 89 and serves to elevate the material above the level of the condensate in the autoclave. Conveyor 87 contains a perforated section 90 in its jacket, which is jacketed by an auxiliary jacket 91. A pipe 92 leads out of the jacket 91 through a valve 93 and leads into another nozzle 40 in the mixer. By manipulation of valve 93, further regulation of the height of the condensate in the autoclave is achieved. In the preferred embodiment of the invention, conveyor 87 is operated at a speed of approximately 300 R. P. M. and sufficient centrifugal force is generated so that a substantial quantity of the mechanically entrained condensate in the material is thrown through the perforations in jacket 90 and out of the material.

Leading out of the conveyor 87 is a duct 95 which is sealed and which terminates in a valve 96, preferably a star valve, that is driven at a uniform rate of speed by suitable drive 97, and serves to discharge the material from the pressure system at a predetermined rate, in the example being considered assumed to be 100 pounds per minute.

Valve 96 discharges in a flash tank 100 against a suitable baffle 101 therein. A pipe 102 connects the tank 100 to a suitable pressure reducer, such as for example a steam ejector 103, through which steam from a source 104 is admitted under the control of valve 105 and discharged with the vapors drawn through pipe 102 through pipe 106 leading to one of the nozzles 40 in the mixer. With this arrangement, the material discharged by star valve 96 is subjected to a sudden change in pressure and flash-steaming will result, and a part of the moisture in the material will thus be removed.

The material is conducted out of the bottom of the flash chamber 100 through a suitable duct 110 and gage 111, into a storage bin 112, from which it is removed by conveyors 113 shown as screw conveyors with suitable drives 114, and discharging into rotary driers 115 which may be connected in parallel and are heated by steam admitted through piping 116 under the control of valves 117. These rotary driers are also equipped with blowers, not shown, by which a current of air is moved through them and ducts 118 to suitable dust collectors 119. The material is dehydrated in the driers down to a predetermined low water content which may be from ten to fifteen percent. Leading out of the driers 115 are ducts 120 which convey the material into rotary coolers 121 through which air is drawn by blowers 122 and discharged into cyclones 123 which entrap any dust or fine particles of material that may be carried away with the air. The rotary coolers 121 cool the dehydrated material down to ordinary room temperature and discharge this material onto conveyors 124 which convey the material to the next step in the process, which, in the case of a rice plant, will be a milling process. As shown, two driers and two coolers are employed in parallel. To meet specific conditions, this arrangement may be varied within the teachings of the invention, and a greater or smaller number of units may be used.

In the processing of certain materials, such as rice, through the steps hereinbefore described, the soaking and parboiling gelatinizes a portion of the material. Dehydrating dries the material from the outside in, and if the material is dried too rapidly, an outer shell may be formed and cracking or checking of that shell often results if rapid dehydrating continues.

In instances of this kind, it may be preferable to withdraw approximately one-half of the water to be taken out of the material and then to allow the material to stand long enough to permit the remaining water in the material to be distributed evenly throughout the grains or particles. Subsequent drying to remove the remaining portion of the water that is to be removed can then be effected without cracking or checking of the kernels. To this end, in Fig. 4 there is shown a modified arrangement of the drying and cooling apparatus wherein duct 110 leading out of the flash tank 100 through valve 111 empties into a conveyor 140 which may conveniently be a screw conveyor driven by a variable speed drive 141 and emptying into a drier 142 which is the same as drier 115 and capable of removing approximately one-half of the total amount of moisture that is to be ultimately removed from the material. The drier empties through duct 143 to a cooler 144 which is identical with the cooler 121 and equipped with a fan 145 by which cool air is drawn through the cooler. At the outlet end 146 of the cooler is a duct 147 that empties into a tempering tank 148 in which the partially dried material is allowed to stand for a sufficient period of time to permit the water remaining in the grains to be evenly distributed therein.

Leading out of the bottom of the tempering tank is a duct 150 which may be equipped with a gate valve 151 by which the flow of material can be regulated, this duct emptying into a conveyor 152 preferably a screw conveyor driven by a variable speed drive 153 and emptying into a second drier 154 which is a duplicate of the other driers herein mentioned. Drier 154 empties into a second cooler 155, also duplicating the other coolers herein, and the material is emptied out of this cooler 155 onto a conveyor such as 124 leading to the next processing apparatus, which, in the case of rice, will be milling apparatus.

With the arrangement shown in Fig. 4, the material may be dried down to a desired low water content without checking or cracking, as might be the case if the drying was carried on at a more rapid rate.

Throughout the drawings and specification, proportioning devices such as star valves and conveyors have been referred to. In certain instances these devices may be used interchangeably and the screw conveyors shown are shown merely to indicate a conveyor, screw or otherwise, as occasion may require.

From the foregoing, it will be apparent that our improved process adapts previous batch processes to continuous process operation through a plurality of steps each capable of accurate control. Material is moved through it at a predetermined rate under the control of variable speed conveyors. The material is pre-soaked by a spray method which achieves a maximum arount of soaking with a minimum amount of water, and as a result the soaking tanks and foundations therefor may be made light, because there is no great excess of water to be supported. Also, the manner of soaking prevents bridging or funneling of the soaking material. Any excess water entrapped in the pre-soaked material is drained off prior to the entry of the material into the mixer so that less water is required to achieve the desired results in the mixer, if it is desired to maintain the water temperature in the mixer at a different value than that in the pre-soaking tanks. Water levels in the pressure system are maintained by draining off excess water and condensate and returning them to the mixer so that the heat contained in them may be utilized. If desired, some of the hot condensate may be sent through heat exchange apparatus to permit heating of water to be used, for example, in the pre-soaking sprays. The stream of material flowing into the autoclave is broken up so that the material may be thoroughly parboiled to a desired degree with a minimum of steam. Excess condensate entrained in the material moving out of the autoclave is removed therefrom and returned to the system for further use. Material discharged from the pressure system is flash-steamed to remove as much moisture from it as possible, thereby minimizing the amount of drying required in the rotary drier. The entire apparatus contains a minimum of moving parts, all of which are capable of being maintained in proper operating condition at low cost.

While we have chosen to illustrate our invention by showing and describing a preferred embodiment of it, we have done so by way of example only and are not to be limited except by the scope of the appended claims.

Having thus complied with the statutes, and shown and described a preferred embodiment of our invention, what we consider new and desire to have protected by Letters Patent is pointed out in the appended claims.

What is claimed is:

1. A pressure cooker for parboiling granular material in a continuous process comprising, a cylindrical sealed tank disposed with its axis vertical, an inlet duct leading into the top of the tank and terminating coaxially thereof and through which the material enters the tank, baffle means within the tank engaged by the material stream which is broken up thereby so that the material gravitates slowly to the bottom of the tank, steam jets for playing live steam on the material as it travels downwardly in the tank, nozzles located above said baffles, a pump for drawing condensate from the bottom of the tank and forcing it through said nozzles onto said material and baffles, a pipe leading out of the bottom of the pipe and containing a valve by which the level of the condensate in the tank is controlled, and a conveyor for carrying the parboiled material out of the bottom of the tank and for elevating it above the level of the condensate therein.

2. A pressure cooker as claimed in claim 1, characterized in that that portion of the conveyor which elevates the parboiled material contains a separator for removing substantial quantities of the mechanically entrapped condensate from the material.

3. A pressure cooker as claimed in claim 1, characterized in that the conveyor that elevates the parboiled material above the condensate level comprises a screw revolving in a perforated casing at a speed high enough to cause substantial quantities of mechanically entrapped condensate to be thrown out of the material by centrifugal force.

4. A pressure cooker as claimed in claim 1, characterized in that the movement of the material out of the cooker is regulated by a star valve through which the material passes on leaving the cooker.

5. A pressure cooker for parboiling granular material in a continuous process comprising, a cylindrical sealed tank disposed with its axis vertical, an inlet duct leading into the top of the tank and terminating coaxially of the tank near the top thereof through which the material is introduced into the tank, a gravitator within said tank engaged by the material which is broken up thereby and made to trickle downwardly in the tank, steam jets within the tank for playing live steam on the material as it trickles downwardly in the tank, nozzles located in the top of said tank around said inlet duct, and a pump for drawing condensate from the bottom of said tank and forcing it through said nozzles to spray upon the material in said gravitator.

PAUL TALMEY.
OTTO R. KUSTER.

(References on following page)

References Cited in the file of this patent

UNITED STATES PATENTS

| Number | Name | Date |
|---|---|---|
| 151,034 | Knox | May 19, 1874 |
| 1,574,210 | Spaoulding | Feb. 23, 1926 |
| 1,705,822 | Lindsey | Mar. 19, 1929 |
| 2,086,181 | Bonotto | July 6, 1937 |
| 2,239,608 | Huzenlaub et al. | Apr. 22, 1941 |
| 2,254,867 | Bonotto | Sept. 2, 1941 |
| 2,334,665 | Yonan-Malek | Nov. 16, 1943 |
| 2,334,666 | Yonan-Malek | Nov. 16, 1943 |
| 2,439,180 | McKee | Apr. 6, 1948 |
| 2,498,573 | Ozai-Durrani | Feb. 21, 1950 |
| 2,525,137 | Jones et al. | Oct. 10, 1950 |

FOREIGN PATENTS

| Number | Country | Date |
|---|---|---|
| 618,502 | Germany | Feb. 14, 1933 |